United States Patent Office

Re. 24,657
Reissued June 16, 1959

24,657

PIPERAZINE CARBONDISULPHIDE COMPLEX ANTHELMINTIC COMPOSITIONS AND METHOD OF USING SAME

John William Guthrie Leiper, Thurgarton, Nottingham, and Thomas Iswel Watkins, West Bridgford, Nottingham, England, assignors to Boots Pure Drug Company, Limited, Nottingham, England, a British company No Drawing. Original No. 2,814,583, dated November 26, 1957, Serial No. 495,812, March 21, 1955. Application for reissue August 8, 1958, Serial No. 755,834

Claims priority, application Great Britain April 2, 1954

5 Claims. (Cl. 167—53)

Matter enclosed in heavy brackets [ ] appears in the original patent but forms no part of this reissue specification; matter printed in italics indicates the additions made by reissue.

This invention relates to new compositions which have been found to be valuable as anthelmintics in veterinary medicine.

The invention consists in compositions which contain the equimolecular complex of carbon disulphide and piperazine as hereinafter defined as active ingredient in combination with an inert diluent. These compositions have been found to be valuable for the removal from pigs, horses and fowls of nematodes of the orders Ascaroidea, Strongyloidea trichinelloidea and is considered to be effective in the removal from pigs and horses of nematodes of the order Spiruroidea. The compositions are also of value for the removal of nematodes of the same orders in cattle, sheep, goats, dogs, cats and foxes, and also the larval stages of the insects of the genus Gastrophilus in horses.

The active ingredient of the compositions of the invention is the compound of empirical formula $C_5H_{10}N_2S_2$ which is prepared by the reaction of equimolecular proportions of carbon disulphide and piperazine. The preparation of this compound has been described by Schmidt and Wichmann (Berichte, 1891, 24, 3243), Herz (Berichte, 1897, 30, 1585) and Charonnat (Attixo congre. intern. chim., 1939, 3, 65), Pavolini and Gambarin (Ann. chim. applicata, 1949, 39, 417). There is speculation by the various authors as to the precise structure of the complex.

The melting point of the compound may vary according to the experimental conditions which are employed in its determination. Thus, if the compound is placed in an open-ended capillary tube contained in a suitable heating bath at room temperature and the temperature of the bath is raised gradually in accordance with normal practice, the compound is observed to sublime (without melting) over a range of temperature of 225–228° C. If however the compound is heated in a sealed capillary tube in a similar manner, it is observed to melt with decomposition but without sublimation at approximately 235° C.

We have found that this complex has anthelmintic activity which is superior to that exhibited by piperazine itself and simple salts thereof. We believe that this is probably due to the fact that the complex may become dissociated in the stomach of the treated animal with the formation of piperazine and of carbon disulphide each of which exhibits an anthelmintic action.

The inert diluents which are employed in the compositions of the invention may be solid or liquid in nature. The solid diluents include diluents which may be edible and which are suitable for preparing pills, capsules or pellets for administration by mouth to the animal to be treated. The solid diluents may also include foodstuffs, for example, pigmeal, poultrymeal etc., which form part of the normal diet (either in the dry or wet state) of the animal to be treated. As liquid diluents there may be used vehicles such as aqueous vehicles which are normally employed in the preparation of animal "drenches."

The concentration of the active ingredient in the compositions is dependent upon the particular compositions under consideration and the amount of the composition which can most suitably be administered to the animal. However the concentration in any particular composition is so chosen that the total amount of active ingredient to be administered to an animal will be equivalent to a dosage of the order of 20 to 250 milligrams per kilogram of the animal depending on the species of animal treated and the helminths against which it is employed.

The nature of the diluent which is employed varies with the species of animal which is to be treated. Thus in the treatment of pigs the diluent is preferably the normal foodstuff for example, a nutritionally adequate pig meal. Where the pig food is normally administered as a wet mash the active complex may be admixed with this mash before administration without interruption of the normal feeding schedule of the animal. In certain feeding methods, however, it is normal practice to present the pig food in the dry state on a continuous basis and where this is the case it is preferable to withhold food from the pig for a short period before presenting a quantity of dry pig food with which the active complex has been admixed [; it is necessary to adopt this procedure in order] to ensure that all the food containing the active ingredient is consumed over a short period of time. It has been found that in pigs the most satisfactory dosage rate of the piperazine-carbon-disulphide complex appears to be 125 mg./kg. although doses as low as 100 mg./kg. have proved effective in individual cases. The upper limit of the dosages which may be employed is dictated largely by economic consideration since the complex is comparatively non-toxic and dosages of the order of 500 mg./kg. have been administered to pigs without producing undesirable toxic symptoms.

The administration of the active complex to fowls may be accomplished by admixture with normal feeding stuffs or preferably by the use of a suitable capsule for example a gelatin-coated capsule. Such capsules may be prepared by methods which are well-known in the art.

The treatment of sheep is most conveniently achieved by the use of a drench containing the active complex. A suitable drench is readily prepared by simple suspension of the requisite quantity of the active complex in water; a wetting agent may be added to the suspension if necessary. It is advantageous to administer such a drench to a sheep immediately after the oral administration of copper sulphate solution which latter serves to stimulate the oesophageal groove and thus ensures that the drench containing the active complex passes immediately into the abomasum (or "fourth stomach") of the sheep.

The administration of the complex to cattle and horses may also be accomplished by the use of a drench. In the case of cattle the drench may be preceded by the administration as in the sheep, of a substance which stimulates the oesophageal groove. As an alternative to a drench in the case of horses it is also possible to employ the use of a bolus i.e. a large pill which contains the requisite amount of the active complex. A suitable bolus comprises active complex in association with an inert solid diluent and can be prepared by methods which are well-known in the art.

The following non-limitative examples illustrate the invention:

EXAMPLE 1

A composition was prepared by admixing 3.36 grams of the equimolecular complex of piperazine and carbon disulphide, of melting point 235° C., with 340 grams of Sow and Weaner pigmeal and the composition was mixed with water and administered to a pig (of weight 33.6 kilos) as one of its two daily feeds. This represented a dosage of anthelmintic of 100 milligrams per kilogram of pig. The faeces eliminated by the pig were examined for the presence of nematodes; in the 24 hours after the administration of the active ingredient, the pig was observed to excrete 7 Ascaris lumbricoides and 255 Oesophagostomum dentatum. The pig was slaughtered 6 days after the administration of the active ingredient and the carcase was examined for the presence of nemotodes. No Ascaris lumbricoides were still present and only 86 Oesophagostomum dentatum still remained. The pig exhibited no toxic symptoms between the time at which it was treated with the anthelmintic and the time at which it was slaughtered.

EXAMPLE 2

A capsule containing 0.272 gram of the piperazine-carbon-disulphide complex was administered orally to a domestic hen weighing 1.36 kilograms. This represented a dosage of 200 mg./kilogram of hen. In the following twenty-four hours the hen excreted 4 Ascaridia, 1 Heterakis and 1 Capillaria. The hen was killed six days after the treatment had commenced; post mortem examination revealed the presence of no further Ascaridia, 17 Heterakis and 379 Capillaria. The hen exhibited no toxic symptoms between the time at which the treatment commenced and the time at which it was killed.

EXAMPLE 3

Twenty pigs of an average weight of 16.8 kilograms were each given as one of their two daily feeds a composition comprising pigmeal, water and sufficient of the equimolecular complex of piperazine and carbon disulphide to represent a dose to each pig of 125 milligrams per kilogram. A total of 106 Ascaris lumbricoides and 140 Oesophagostomum dentatum was excreted by the pigs in the 24 hours following treatment. It was not possible to slaughter the pigs and examine the carcases for the presence of residual helminths but an examination of the faeces of the pigs 7 days after treatment showed the complete absence of worm eggs indicating that the helminths of the above species had been completely eliminated.

EXAMPLE 4

In a similar experiment to that described in Example 3, 6 pigs of an average weight of 48.8 kilograms were allowed no food for 16 hours and were then given a quantity, representing one quarter of their total daily food requirements, of a dry mixture of a pigmeal and the equimolecular complex of piperazine and carbon disulphide. The latter complex was present in such a concentration that each pig received a dosage approximately equivalent to 150 milligrams per kilogram. In the 24 hours following treatment a total of 21 Ascaris lumbricoides and 10 Oesophagostomum dentatum was excreted by the pigs. An examination of the faeces of the pigs 7 days after treatment showed the complete absence of worm eggs of the above species.

EXAMPLE 5

A domestic hen weighing 1.304 kilograms was treated with a gelatin-coated capsule containing 75 milligrams of the equimolecular complex of piperazine and carbon disulphide; this represented a dose of 57.5 milligrams per kilogram. In the 24 hours following treatment the hen was observed to excrete 4 Ascaridia and at a post mortem examination 7 days later no remaining Ascaridia were found in the carcase.

EXAMPLE 6

Three horses were each given either as a drench or by stomach tube an [aequeous] *aqueous* suspension of the equimolecular complex of carbon disulphide and piperazine. The suspensions were prepared by shaking the solid compound with water without the addition of wetting agents. The details of dosage and number and class of helminths which were subsequently excreted are given in the following table. It was not possible to slaughter the animals and examine the carcases for the presence of residual worms.

| Wt. of horse (kg.) | Wt. of complex given | Dosage, mg./kg. | Worms excreted | |
|---|---|---|---|---|
| 600 | 48 g. in 450 cc. of water. | 80 | 61,240 | (Estim.) Trichonema spp. |
| | | | 12 | Strongylus spp. |
| | | | 2 | Gastrophilus intestinalis (bots). |
| 495 | 24.8 g. in 450 cc. of water. | 50 | 27,940 | Trichonema spp. |
| | | | 4 | Gastrophilus intestinalis (bots). |
| 604 | 90 g. in 450 cc. of water. | 149 | 11,400 | Trichonema spp. |
| | | | 7 | Strongylus spp. |

What we claim is:

1. An anthelmintic composition comprising the molecular complex of carbon disulfide and piperazine having the empirical formula $C_5H_{10}N_2S_2$ admixed with a solid animal food.

2. An anthelmintic composition according to claim 1 in which said solid animal food is a pig food.

3. A method of treating an animal for the removal of helminths, which comprises administering orally to the animal the molecular complex of carbon disulphide and piperazine, having the empirical formula $C_5H_{10}N_2S_2$ in admixture with an animal fodder at a dosage rate of 20 to 250 mgm. of said molecular complex per kgm. body weight of the animal.

4. The method of claim 3 in which said complex is administered in admixture with pig meal.

*5. A method of treating an animal for the removal of helminths, which comprises administering orally to the animal the molecular complex of carbon disulphide and piperazine, having the empirical formula $C_5H_{10}N_2S_2$ in admixture with a diluent normally consumed by the animal at a dosage rate of 20 to 250 mgm. of said molecular complex per kgm. body weight of the anmal.*

References Cited in the file of this patent or the original patent

UNITED STATES PATENTS 2,696,455 Blair ---------- Dec. 7, 1954

OTHER REFERENCES

Charonnat: Chem. Abst., vol. 33, 1939, p. 9306–5.

White: British Med. Jour. No. 4839, Oct. 3, 1953, pp. 755–758.

Winslow: Veterinary Materia Medica and Therapeutics, 8th ed., 1919, Am. Veterinary Publ. Co., Chicago, Ill., p. 211.